United States Patent [19]

Byers

[11] Patent Number: 5,118,414
[45] Date of Patent: Jun. 2, 1992

[54] ROTARY SCREENING DEVICE

[76] Inventor: Edward V. Byers, Magnolia, Main St., Konoulton, Nottingham, Great Britain

[21] Appl. No.: 678,970
[22] PCT Filed: Oct. 25, 1989
[86] PCT No.: PCT/GB89/01272
  § 371 Date: Jun. 21, 1991
  § 102(e) Date: Jun. 21, 1991
[87] PCT Pub. No.: WO90/04446
  PCT Pub. Date: May 3, 1990

[30] Foreign Application Priority Data

Oct. 25, 1988 [GB] United Kingdom ............ 8825259.8

[51] Int. Cl.⁵ .................. B01D 33/044; B01D 33/46
[52] U.S. Cl. .................. 240/158; 210/159; 210/396; 210/488
[58] Field of Search .......... 210/158, 159, 161, 396, 210/397, 402, 488, 495

[56] References Cited

U.S. PATENT DOCUMENTS

| 606,453 | 6/1898 | Fryer | 210/396 |
|---|---|---|---|
| 1,430,198 | 9/1922 | Stebler | 210/158 |
| 2,137,556 | 11/1938 | Young | 210/488 |
| 3,387,712 | 6/1968 | Schrink | 210/411 |
| 4,153,557 | 5/1979 | Hori | 210/158 |
| 4,261,822 | 4/1981 | Richardson | 210/161 |
| 4,303,508 | 12/1981 | Skretting | 209/297 |
| 4,517,089 | 5/1985 | Arnaud | 210/488 |
| 4,521,305 | 6/1985 | Deal | 210/161 |

FOREIGN PATENT DOCUMENTS 268551 5/1988 European Pat. Off. .

Primary Examiner—Stanley S. Silverman
Assistant Examiner—Christopher Upton
Attorney, Agent, or Firm—Stanley J. Price, Jr.

[57] ABSTRACT

A rotary screening device for separating unwanted solid matter such as sewage, weeds, tar globules and fish from water which is to be used for special purposes such as water cooling or other plant processes. The device comprises a rotating hollow stack of closely spaced coaxially mounted annular discs, each of which is provided with peripheral teeth upon which unwanted solid matter may be caught and carried away to a collection zone and by scraper elements engaging annular tracking surfaces between the teeth on adjacent discs. The tracking surfaces have apertures or slits to permit passage of cleaned water to the interior of the hollow stack to which may be connected stationary ducting means for conveying the cleaned water therefrom.

7 Claims, 3 Drawing Sheets

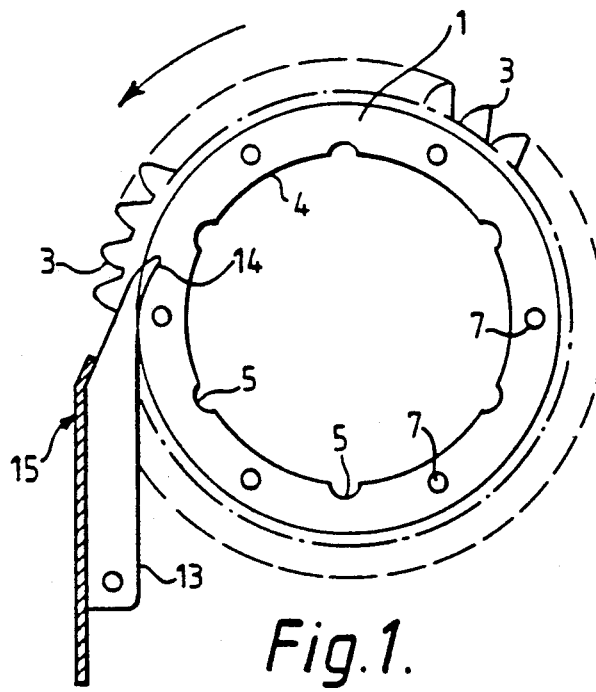
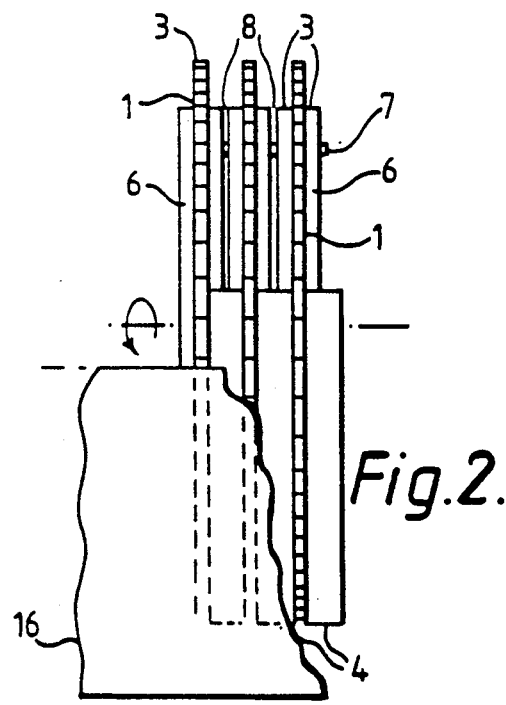
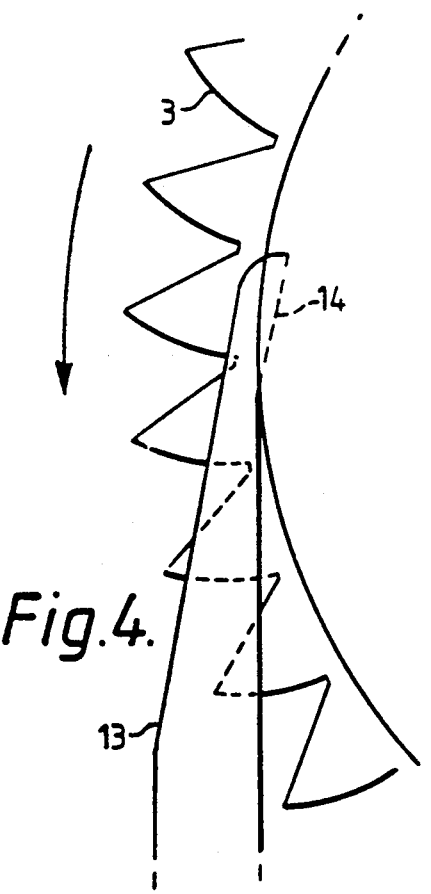
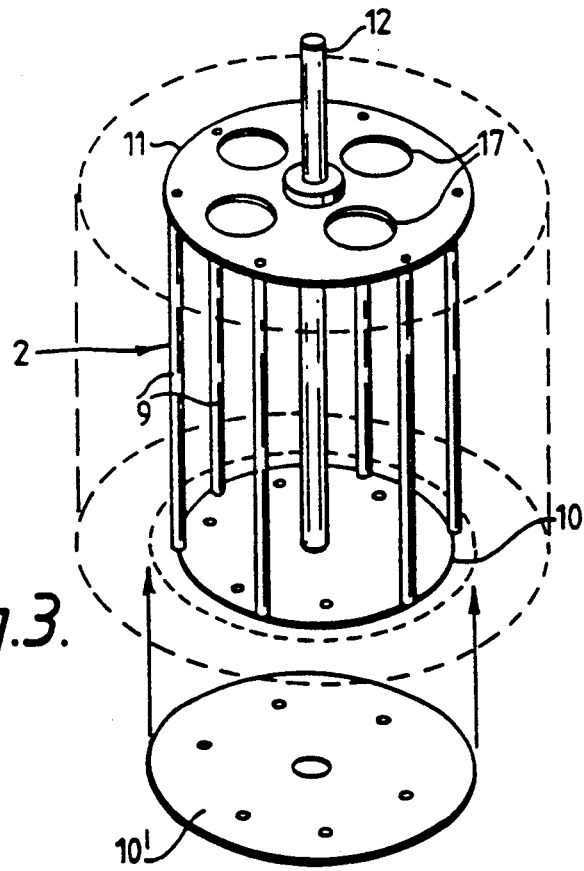
Fig.1.
Fig.2.
Fig.3.
Fig.4.

ROTARY SCREENING DEVICE

FIELD OF THE INVENTION

The present invention relates to a rotary screening device for separating unwanted solid matter from sea or fresh water. It is particularly directed towards the removal of such matter floating at indeterminate depths, such as sewage, weeds, fish, jelly fish and tar balls.

BACKGROUND OF THE INVENTION

Solid matter such as weeds and jelly fish floating or submerged in water can be a considerable nuisance when the water is to be used for a special purpose for example sea water in a desalination plant, or fresh water for cooling in manufacturing plant process.

The water intake ducts used for such purposes are usually provided with filters for screening unwanted solid matter before the water reaches its destination.

However, the use of filters does not entirely solve the problem because certain solid matter is able on occasions to get past the filters and in the case of tar balls for example the filters themselves merely become blocked.

Further algae and such other weed growth tend to block intake filters in certain parts of the world.

SUMMARY OF THE INVENTION

It is an object of the present invention to provide a screening device which is able to remove unwanted solid matter from water subsequently to be used for a special purpose, including floating solid matter and matter such as tar balls which move at indeterminate depths beneath a water surface.

According to the invention there is provided a rotary screening device for separating unwanted solid matter such as weeds, fish and tar balls from a body of water comprising a rotable support body, a plurality of rows of peripheral teeth on the support body for collecting unwanted solid matter from the water as the support body is rotated in the water, a scraper element engaging an annular surface provided between each of the peripheral rows of teeth to remove said unwanted matter collected thereon for discharge to the collection zone, access passageway means for water cleaned of said unwanted solid matter, to the interior of said support body, and discharge means for conveying away the cleaned water passing through said interior of said support body.

Preferably the peripheral teeth are formed on individual annular elements the central apertures of which permit them to be mounted on the support body in a stacked array The periphery of each annular aperture may then be provided with a series of spaced notches for engagement with a series of axially extending rods of the support body defining a hollow interior thereof.

The support rods are preferably held between two transversely extending end plates to complete the support body for the annular elements of the device, one of the end plates having apertures forming an outlet for cleaned water from the hollow interior of the support body.

The sides of each of the annular elements are provided with annular flanges having protuberances which serve to separate the annular flanges in the stacked array thereby providing annular slits leading to the hollow interior of the support body, the annular flanges providing the annular surface for the scraper elements which occupy the space provided between the adjacent annular elements in the stacked array.

Other features and advantages of the present invention will become apparent from the more detailed disclosure which follows.

BRIEF DESCRIPTION OF THE DRAWINGS

Embodiments of the present invention will now be described by way of example with reference to the accompanying drawings wherein:

FIG. 1 is a side view showing a single toothed disc and co-operating scraper element of a rotatory screening device according to an embodiment of the invention;

FIG. 2 is a front view of a stacked assembly of the toothed annular elements shown in FIG. 1;

FIG. 3 is a perspective view of a carrier assembly for the annular elements shown in FIG. 1;

FIG. 4 is an enlarged view illustrating an engagement of the scraper elements of the device as shown in FIGS. 1 and 2 engaging the annular clean water slits formed between adjacent annular elements in the stacked assembly.

BEST MODES OF CARRYING OUT THE INVENTION

Figure 5:
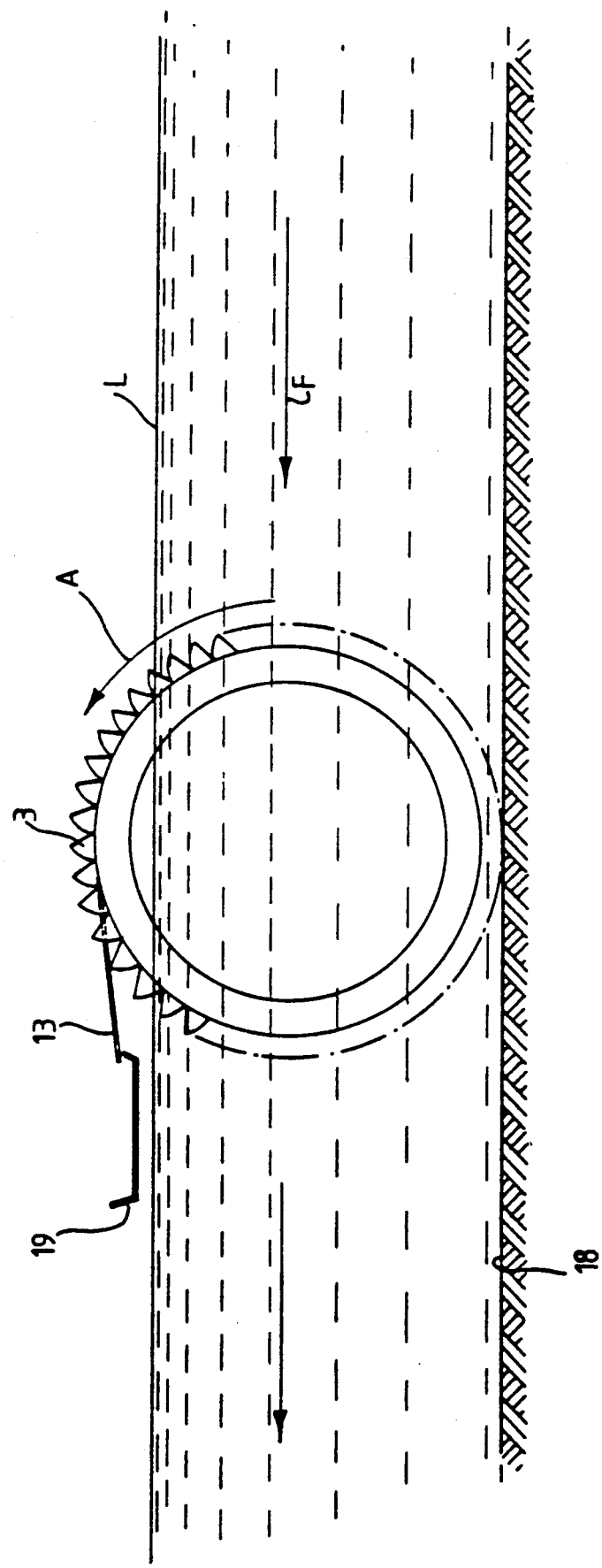

The rotary screening device according to an embodiment of the invention as shown in FIGS. 1 to 4 comprises a series of annular elements 1 adjacently positioned in stacked assembly, see FIG. 2, on a rotatable support body 2. Each annular element 1 is provided with a peripheral row of teeth 3.

The sides of each annular element 1 are provided with circular flanges 6 of equal radius.

The flanges 6, see FIG. 2, are separated from one another by a small gap, the gap being maintained by means of protuberances 7, formed on one of the facing flanges 6, the thus formed gap providing an annular slit 8 communicating with the interior of the rotatable support body 2.

The support body 2 is composed of axially extending parallel rods 9 the ends of which are fastened to the peripheral edge of two transversely extending circular end plates 10 and 11 the plate 11 being of large diameter such that a semi-circular section of each rod sits proud of the circular periphery of the end plate 10.

The periphery of the circular apertures 4 in each annular elements 1 is provided with a series of notches 5 whose profile corresponds to the semi-circular section of the rods 9, sitting proud of the periphery of the end plate 10.

By this means each annular element 1 may be slidably mounted on the support body 2 over the end plate 10, by means of the notches 5 engaging the semi-circular sections of the rods 9 thereby to key the annular elements to the support body 2.

The annular elements 1 are held together on the support body 2, between the larger end plate 11, and a closure plate 10' attached to the plate 10, thereby to complete the confinement of the stacked array.

The support body 2 has an axial shaft 12 which may be journalled for rotation in bearings (not shown) at one or both ends depending upon whether it is to be used with the shaft verical or in a horizontal position, and by means of a suitable motor drive (not shown).

One end of a pivotally mounted scraper element 13 engages the surface of the flanges 6 between the annular elements 1 as the support body rotates. Each scraper element 13 has a width which corresponds substantially to the width between the adjacent annular elements 1 as shown, and is provided with an extension piece 14 on its lower side which engages the annular slits 8 between the annular flanges 6.

Each scraper element 13 is urged to its scraping position by means of a spring 15.

The teeth on each annular rotatable element shown more particularly in FIG. 4 have operative faces forming involute curves to a base circle to which the face of the scraper element 13 is tangential.

The attack angle between a tooth and the face of a scraper element is 90° throughout the engagement zone although other constant attack angle arrangements may be designed as disclosed for example in UK Patent 2190605.

To complete the assembly as shown in FIG. 3 a metal plate 16 extends across the assembly such that as the teeth rotate in the direction of the arrow unwanted solid matter collected thereon is thrown over the plate 16 as is matter scraped from the surface formed by the annular flanges 6 under the action of the scraper elements, thereafter to be delivered to a discharge zone (not shown).

Clean water, that is water from which has been separated unwanted solid matter, passes through the annular passageways or slits 8 to the interior of the support body from whence is may be drawn off through apertures 17 in the larger end plate 11 by suitable suction means to a snugly fitting stationary discharge duct (not shown).

Figure 6:
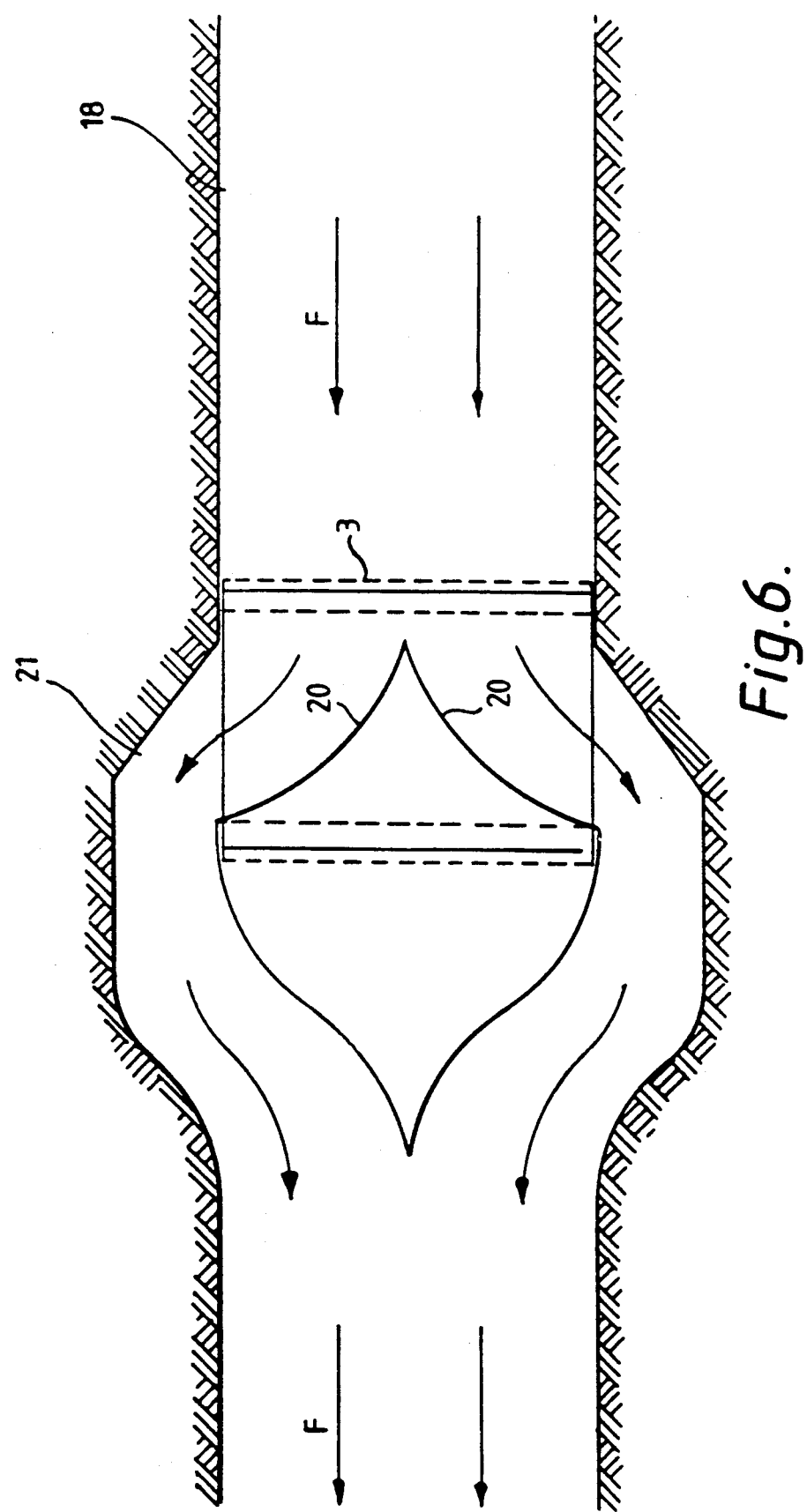

FIGS. 5 and 6 illustrate by way of example, a specific use of the device described above in the treatment of sewage.

The rotary screening device of the arrangement shown in FIG. 2, is shown in FIGS. 5 and 6 positioned in a channel 18 carrying water contaminated with sewage effluent and flowing in the direction F such that the rotating teeth 3 encounter the entire flow of water arriving from the upstream direction.

In the illustration shown rotation of the teeth 3 is such that the teeth 3 are ascending relative to the arriving flow as shown by arrow A thereby to capture solid matter in the sewage and carry it above the level of the water L in the confined flow, where it is stripped from the teeth 3 by the scraper elements 13, and delivered to a laterally extending conveyor 19 for suitable disposal.

Cleaned water passes through the slits 8 between the annular elements 1 of the stacked assembly and downstream of the confined water flow.

To ensure that the slits 8 do not themselves become clogged by matter which might pass through the slits 8, and be unable to escape from inside the stack, the interior of the support body 2, see FIG. 6, is provided with stationary deflectors 20 which direct the cleaned water to the apertures 17 in the end plate 11, see FIG. 3, and or similar apertures provided in the end plates 10 and 10'.

To provide for sideways deflection of the cleaned water from the interior of the stacked assembly to the downstream side of the screening device, the channel 18 is provided with a widened section 21 as shown.

In the application shown in FIG. 5 and 6 the teeth 3 operate over a small distance above the water surface.

Operation in a totally submerged position is possible to deal entirely with submerged solid matter such as tar balls, and preferably in a water current which has been flowing quiescently for a sufficient time to allow fine grits such as sand to have been gravitationally rejected.

A large installation may comprise a number of rotary screening devices suspended from a bridge carrying the main common driving means.

To cater for an occurence where tar balls are encountered in large quantities it is envisaged that a trip switch would be included in the operating drive which would actuate upon a large increase in driving torque consequent upon the drag effect produced by the viscosity of the tar.

I claim:

1. A rotary screening device for separating unwanted solid matter such as weeds, fish and tar balls from a body of water comprising a rotatable support body, a plurality of spaced apart rows of peripheral teeth on the support body for collecting unwanted solid matter from the water as the support body is rotated in the water, a plurality of scraper elements, each contacting an annular surface formed by spaced apart side flanges provided between each of the peripheral rows of teeth to remove said unwanted matter collected thereon for discharge to a collection zone, access passageway means for water cleaned of said unwanted solid matter through an annular gap between adjacent side flanges to the interior of said support body, and discharge means for conveying away the cleaned water out of said interior of said support body.

2. A rotary screening device claimed in claim wherein said peripheral teeth and said side flanges are formed on individual annular elements arranged in abutting spaced relationship on said support body.

3. A rotary screening device as claimed in claim 2 wherein the support body is formed of an annular array of axially extending rods the ends of which are attached to transversely extending closure plates, said annular elements being mounted around said rods.

4. A rotary screening device as claimed in claim 3 wherein one of the side flanges on each annular element is provided with protuberances thereby to form said annular gap between adjacent annular elements forming said access passageway means for passage of cleaned water to the interior of the support means.

5. A rotary screening device as claimed in claim 4 wherein said discharge means comprises apertures in at least one of the end plates for conveying cleaned water from the interior of the support means to a stationary duct in communication with said interior 6. A rotary screening device as claimed in claim 5 wherein each said scraper element has a projecting piece which enters the annular gap formed between said annular flanges.

7. A rotary screening device as claimed in claim 5 and having stationary internal deflectors positioned in the interior of said support body which direct clean water entering the support body from an upstream direction to the apertures formed in the end plates.

* * * * *